March 15, 1949. E. F. ANDREWS 2,464,285
AIRCRAFT WITH RETRACTABLE VARIABLE-RADIUS ROTARY WING
Filed March 10, 1941 9 Sheets-Sheet 1
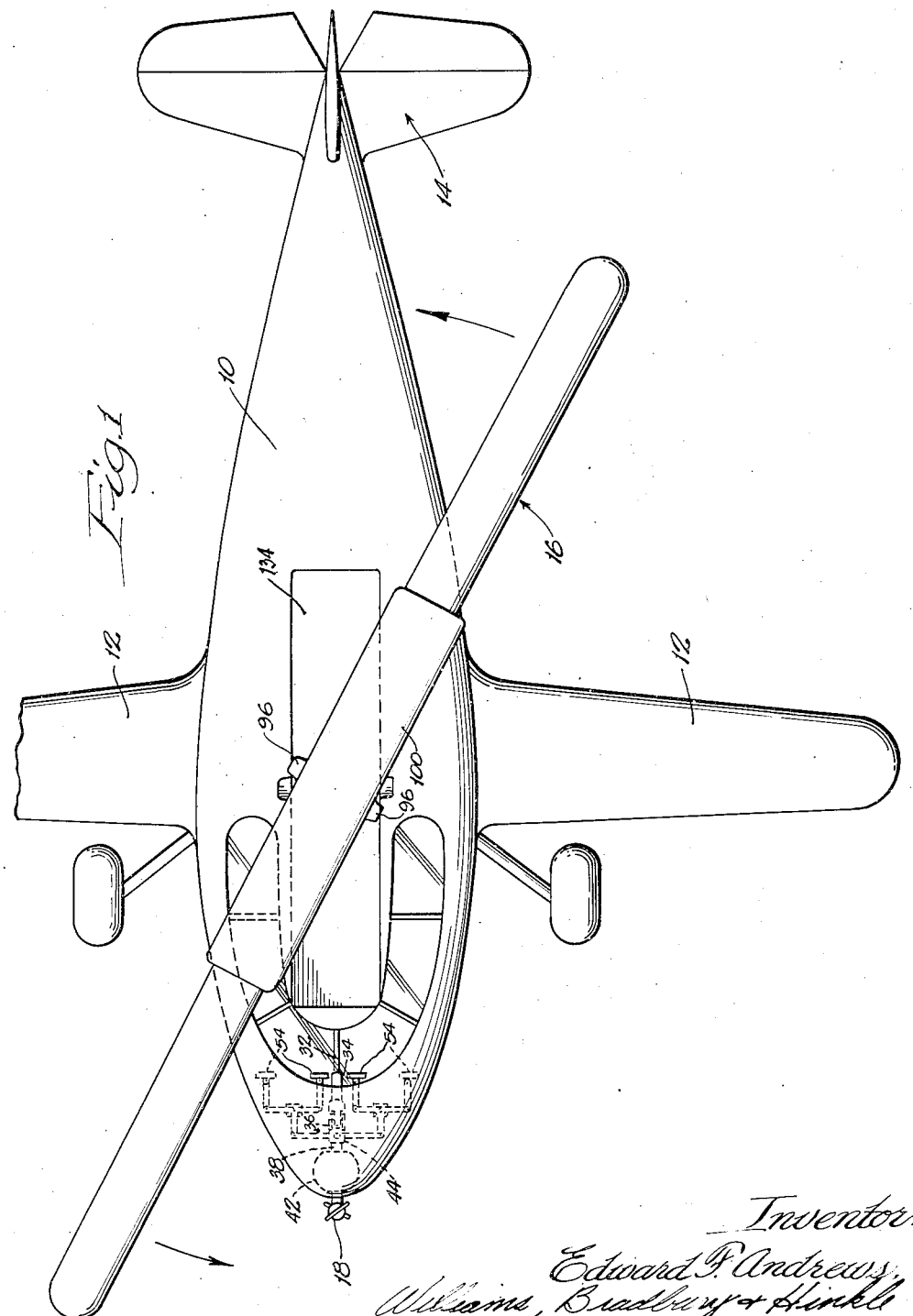

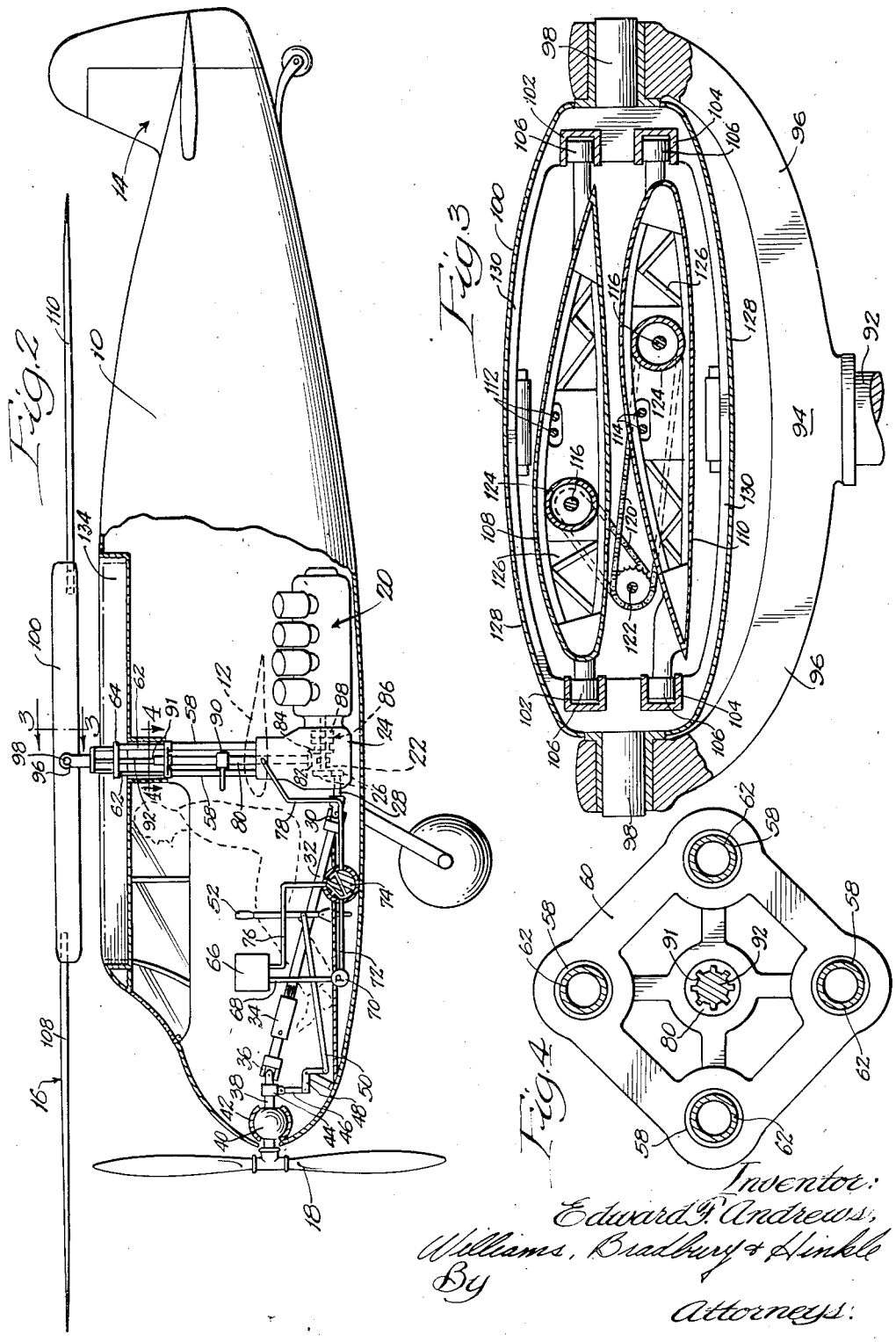

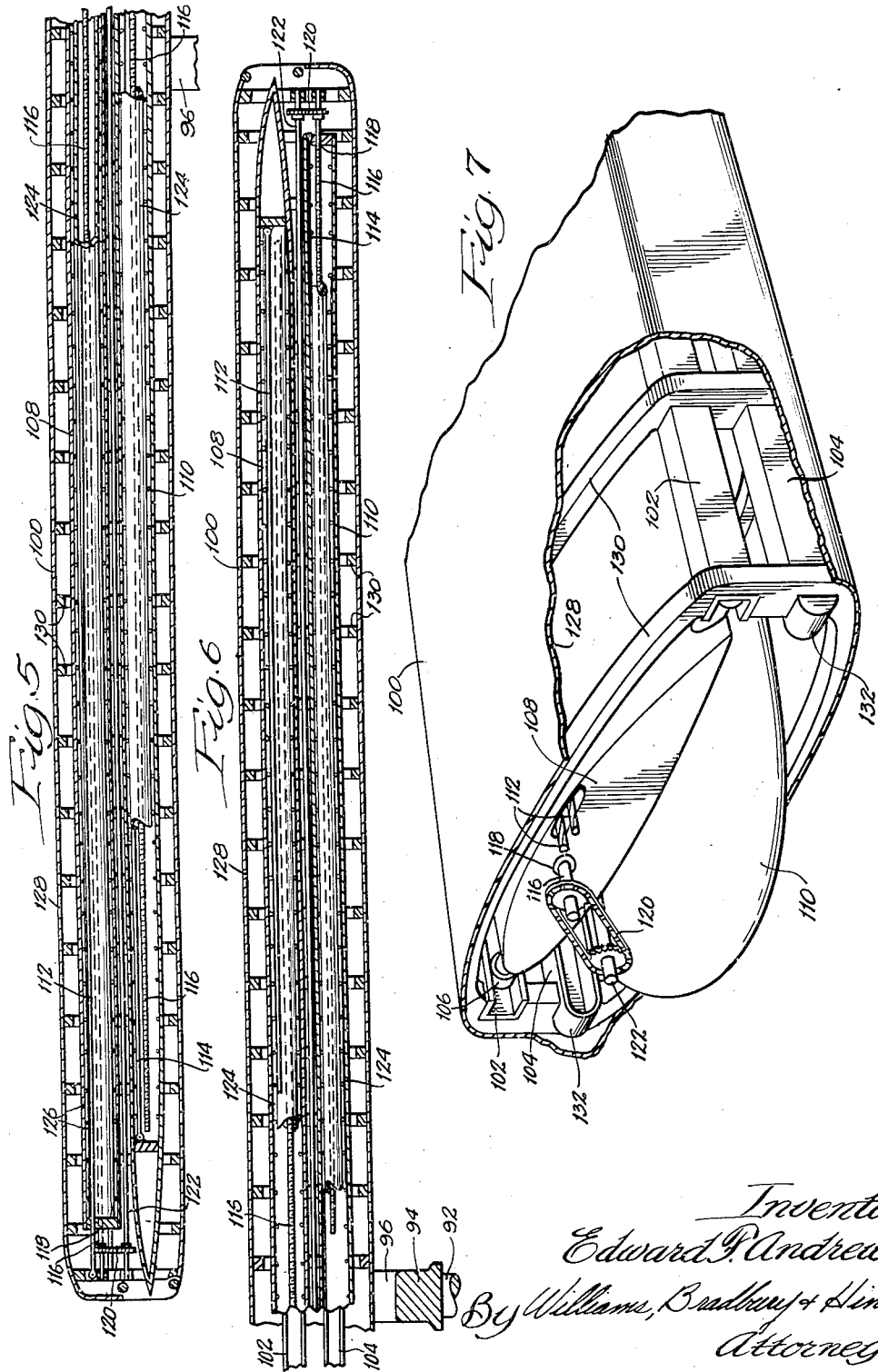

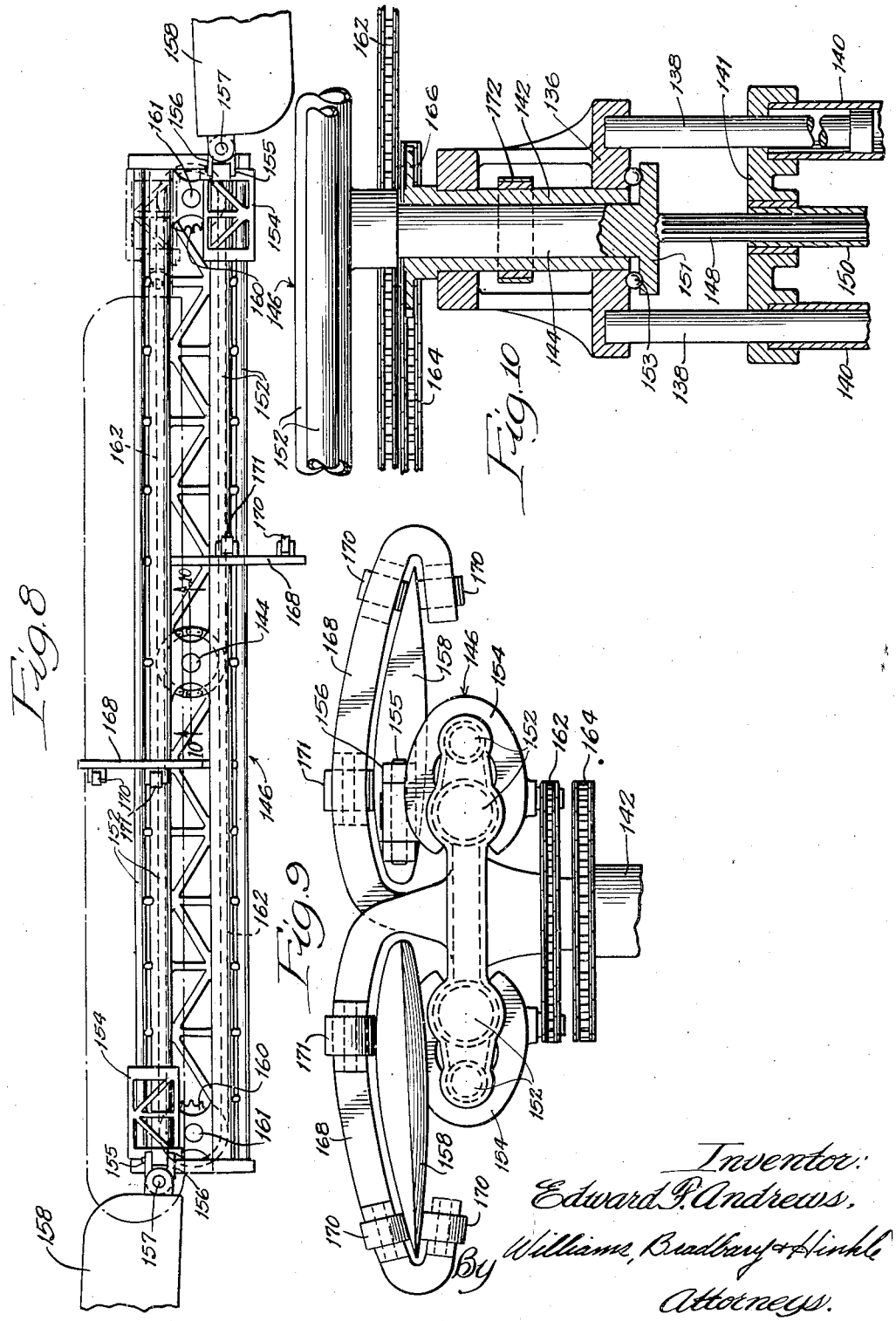

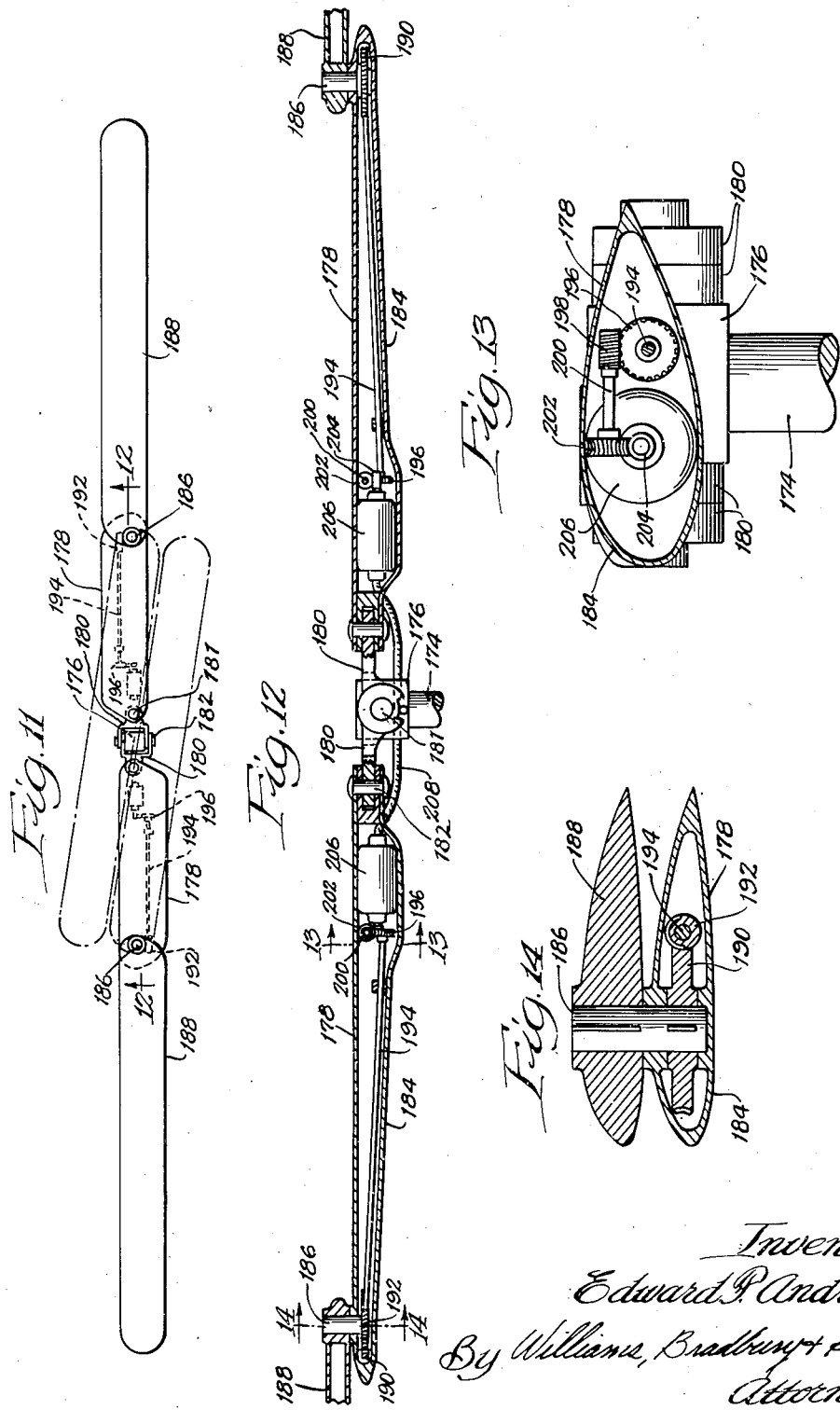

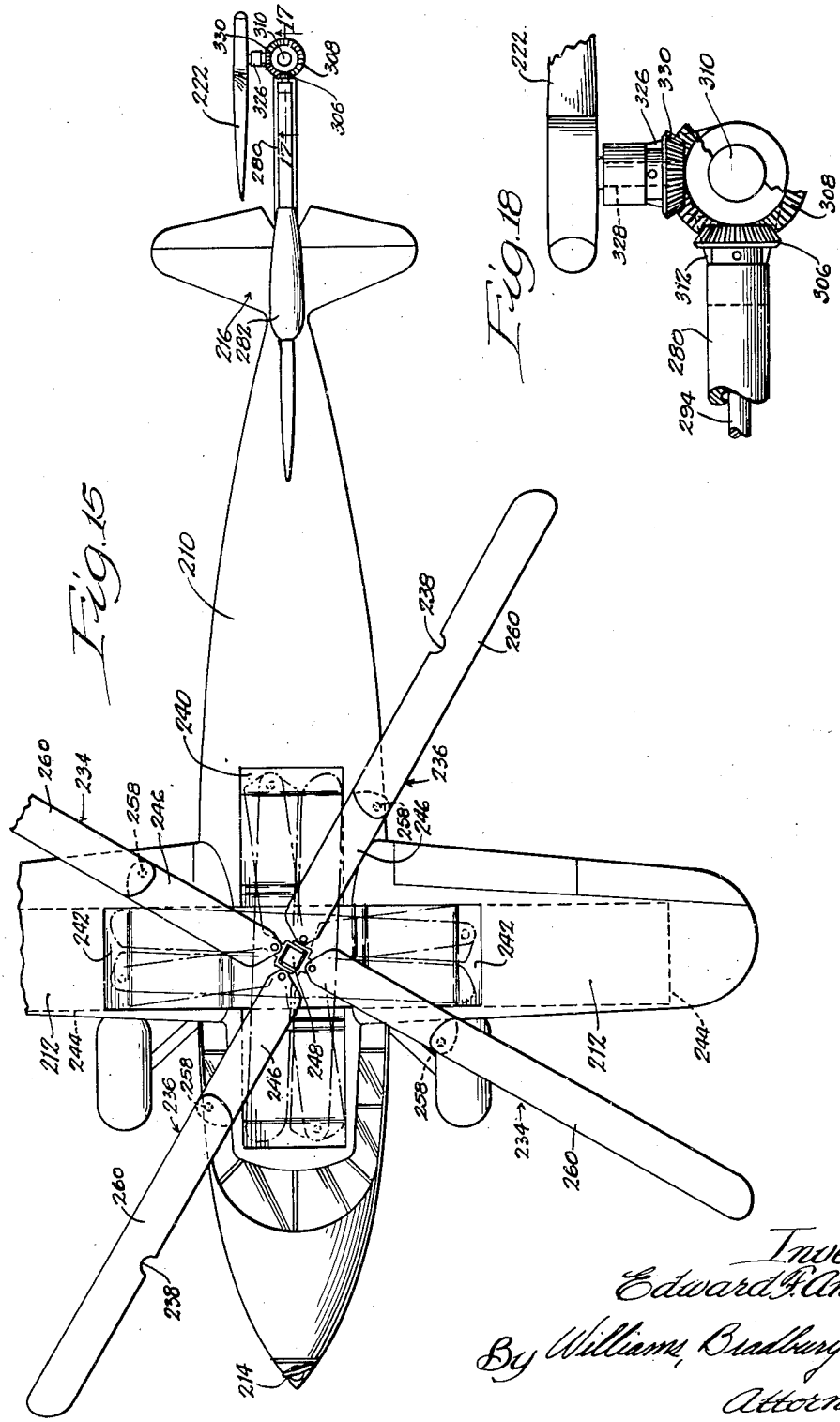

March 15, 1949.　　　　E. F. ANDREWS　　　　2,464,285
AIRCRAFT WITH RETRACTABLE VARIABLE-RADIUS ROTARY WING
Filed March 10, 1941　　　　　　　　　　9 Sheets-Sheet 7
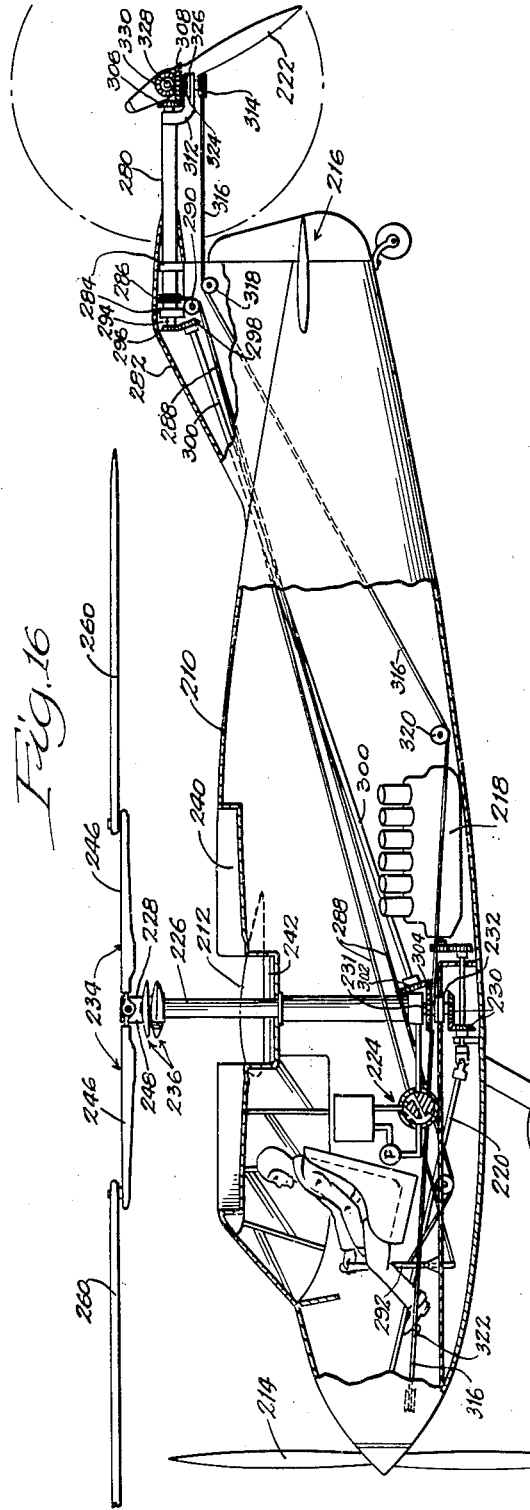
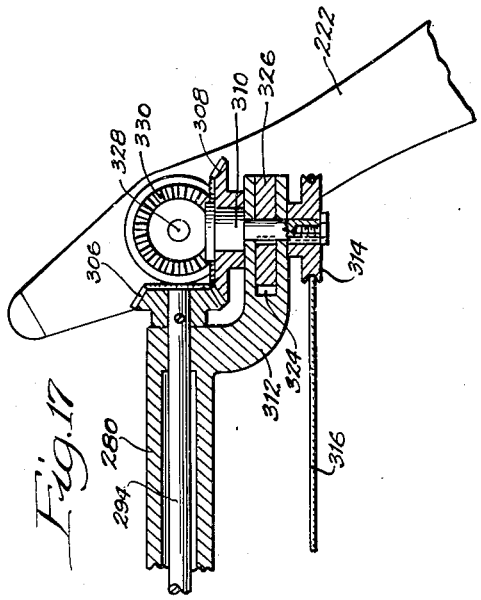
Inventor:
Edward F. Andrews,
By Williams, Bradbury
Hinkle
Attorneys.

March 15, 1949.  E. F. ANDREWS  2,464,285
AIRCRAFT WITH RETRACTABLE VARIABLE-RADIUS ROTARY WING
Filed March 10, 1941  9 Sheets—Sheet 8
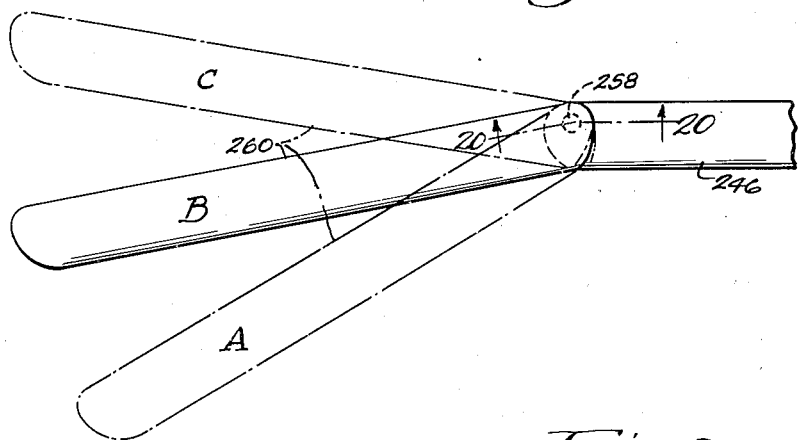
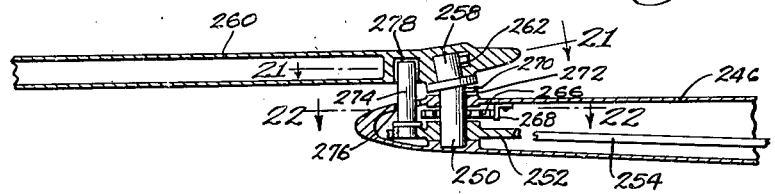
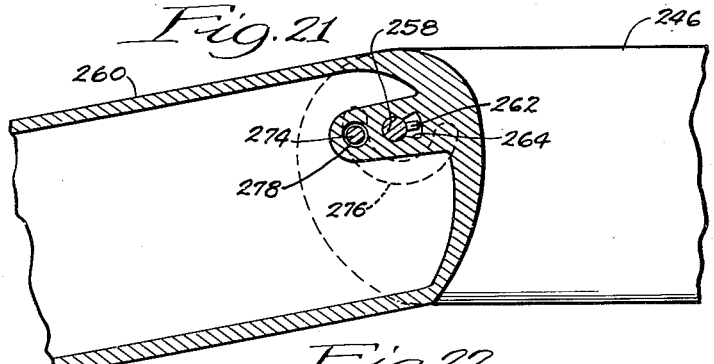
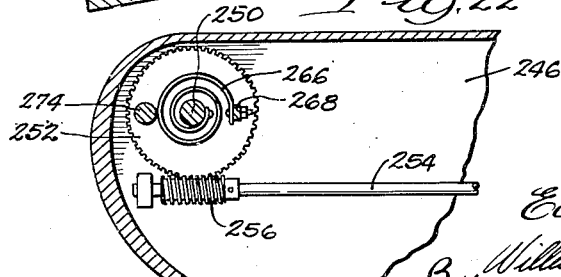
Inventor:
Edward F. Andrews,
By Williams, Bradbury & Hinkle
Attorneys.

March 15, 1949.  E. F. ANDREWS  2,464,285
AIRCRAFT WITH RETRACTABLE VARIABLE-RADIUS ROTARY WING
Filed March 10, 1941  9 Sheets-Sheet 9
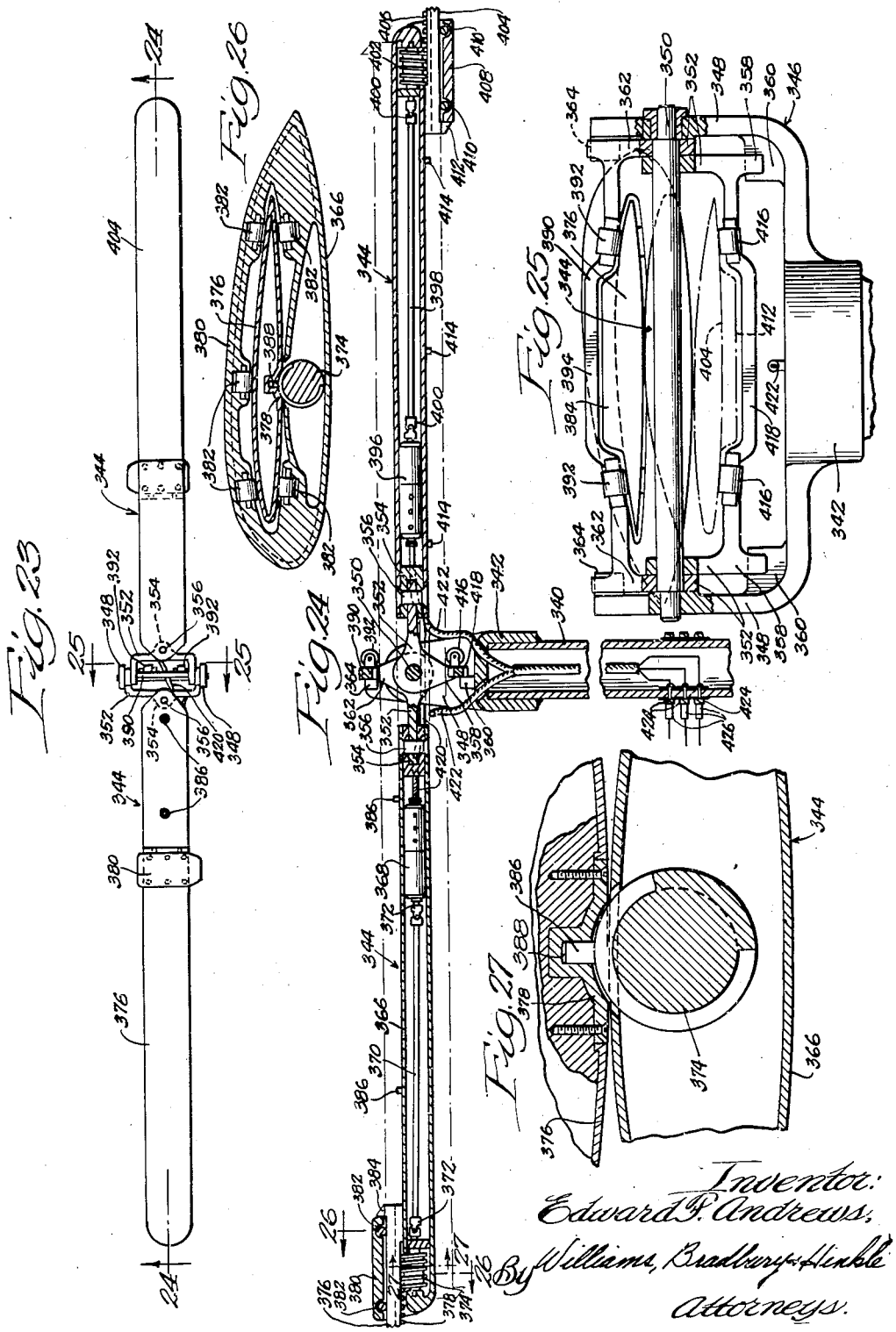

Patented Mar. 15, 1949

2,464,285

UNITED STATES PATENT OFFICE 2,464,285

AIRCRAFT WITH RETRACTABLE VARIABLE-RADIUS ROTARY WING

Edward F. Andrews, Chicago, Ill.

Application March 10, 1941, Serial No. 382,476

22 Claims. (Cl. 244—6)

This invention relates to rotating wing aircraft and is concerned with the type of aircraft having a rotating wing of relatively large disc area, the diameter of which can be varied to facilitate relatively compact disposal of the rotor when not in use. Provision is also made in the present invention to otherwise vary the characteristics of the rotating wing while it is in use. Still further, the invention has particular reference to the type of aircraft in which a relatively large rotating wing is employed for low speed flying, but in which the rotating wing is completely housed in the aircraft structure during high speed flight. During such high speed flight the lift is provided by a relatively small fixed wing. The advantages of such a structure are set forth more fully in my copending application, Serial No. 148,085, filed June 14, 1937, now Patent No. 2,330,803.

It is among the objects of the present invention to provide a novel aircraft of the above type wherein the diameter of the rotating wing may be reduced to substantially one-third its extended diameter for purposes of disposal during flight.

Furthermore, it is an object of my invention to accomplish the reduction in diameter of the rotating wing by retracting the outer sections so that they are substantially co-extensive with the center section. When the rotating wing is so retracted, it forms a relatively thin, generally rectangular structure readily housed within a shallow pocket in the top of the fuselage or, in the case of a four-bladed rotor, in pockets in the top of the fuselage and in the top of the fixed wing.

An additional object is to provide novel auxiliary means for controlling one or more propellers for the purpose of neutralizing the torque reaction when power is applied to the rotating wing from the aircraft motor.

Additionally, the auxiliary means last mentioned is adapted for providing effective low speed control of the aircraft about the pitch and yaw axes.

As a further object, the invention provides means for effecting complete and independent articulation of each of the rotor blades and for controlling the diameter of the disc and also the pitch of the blades so articulated.

As a further object of my invention, a novel aircraft is provided with means for retracting the rotating wing into the structure of the aircraft when collapsed to minimum diameter and for reducing to a minimum the drag of the auxiliary propeller under high speed flight conditions when the lift is provided exclusively by the fixed wing.

As yet another object of my invention, I provide an aircraft having novel and advantageous structures for varying the plane of rotation of an auxiliary control propeller around two axes, together with provision for special drive means and control means therefor.

A further object of my invention is to provide an aircraft having novel structure for varying the diameter of the rotating wing by pivoting the outer portion of each blade backwardly and inwardly, and for varying the pitch of the outer portion of each blade by means of the same control mechanism.

Other objects and advantages of the present invention will become apparent from the following description of several alternative embodiments thereof, taken together with the accompanying drawings, in which:

Fig. 1 is a somewhat diagrammatic plan view of an aircraft embodying one of the alternative forms of my invention;

Fig. 2 is a side elevation of the aircraft shown in Fig. 1 with a portion of the fuselage broken away to show the arrangement of the mechanism therein;

Fig. 3 is a transverse sectional view through the rotating wing, and may be considered as taken in the direction of the arrows substantially along the line 3—3 of Fig. 2. In this view the parts are shown in the positions they assume when the outer portions of the rotating wing are retracted;

Fig. 4 is a horizontal sectional view taken substantially along the line 4—4 of Fig. 2 looking downwardly as indicated by the arrows;

Figs. 5 and 6 show, respectively, the left-hand portion and the right-hand portion of the rotating wing in vertical longitudinal section, and illustrate the positions assumed by the wing elements when retracted;

Fig. 7 is a perspective view of one end of the center section of the rotor with the outer wing portions in retracted position. In this view the extreme end of the housing and a portion of the side wall thereof have been broken away to show the parts therebeneath;

Fig. 8 is a plan view of an alternative rotating wing for use with the aircraft shown in Figs. 1 and 2;

Fig. 9 is an end view of the rotating wing shown in plan in Fig. 8;

Fig. 10 is a transverse sectional view through the center of the rotor, and may be considered as taken in the direction of the arrows along the line 10—10 of Fig. 8;

Fig. 11 is a plan view of a rotor embodying still another embodiment of the present invention;

Fig. 12 is a longitudinal vertical sectional view of the rotating wing shown in Fig. 11 and is taken substantially in the direction of the arrows along the line 12—12 of Fig. 11;

Fig. 13 is a vertical transverse sectional view through one of the rotating vanes, taken in the direction of the arrows along the line 13—13 of Fig. 12; and shows in greater detail the arrangement of the wing retracting mechanism;

Fig. 14 is a vertical transverse sectional view taken in the direction of the arrows along the line 14—14 of Fig. 12;

Fig. 15 is a plan view of an aircraft comprising still another alternative embodiment of my invention. In this embodiment the aircraft is provided with a four-bladed rotating wing rather than a two-bladed wing, as illustrated in the previously described figures;

Fig. 16 is a side elevation of the aircraft shown in Fig. 15 with a portion of the fuselage broken away to show the structure therebeneath;

Fig. 17 is a longitudinal sectional view through a portion of the mechanism for supporting, driving and controlling the auxiliary control propeller. This view may be considered as taken in the direction indicated by the arrows substantially along the line 17—17 of Fig. 15. These section lines are also shown on Fig. 18;

Fig. 18 is a plan view of the control propeller mechanism and may be considered as an enlargement of the rearward portion of the aircraft shown in Fig. 15;

Fig. 19 is a diagrammatic representation of the outer portion of an alternative blade having a variable angle of incidence;

Fig. 20 is a longitudinal sectional view taken in the direction of the arrows substantially along the line 20—20 of Fig. 19;

Fig. 21 is a horizontal sectional view taken along the line 21—21 of Fig. 20 and looking downwardly as indicated by the arrows;

Fig. 22 is a horizontal sectional view looking downwardly as indicated by the arrows and taken substantially along the line 22—22 of Fig. 20;

Fig. 23 is a plan view of still another alternative aircraft rotor embodying my invention;

Fig. 24 is a vertical longitudinal sectional view taken in the direction of the arrows along the line 24—24 of Fig. 23;

Fig. 25 is a transverse sectional view which may be considered as taken in the direction of the arrows substantially along the line 25—25 of Fig. 23 with the outer rotor section retracted;

Fig. 26 is a transverse sectional view which may be considered as taken in the direction of the arrows substantially along the line 26—26 of Fig. 24; and Fig. 27 is a fractional transverse sectional view taken in the direction of the arrows along the line 27—27 of Fig. 24.

Referring to Figs. 1 and 2 of the drawings, the aircraft illustrated is comprised generally of a fuselage 10, fixed wings 12, empennage 14, rotating wing 16, and propeller 18. Within the fuselage and slightly behind the center of gravity of the aircraft, an engine 20 is connected to a central transmission shaft 22 extending through a transmission housing 24. At its forward end the transmission shaft 22 is connected by gears 26 to an output shaft 28, connected in turn through a universal joint 30 to a drive shaft 32. Near its forward end this drive shaft is connected by a splined coupling 34 to a second universal joint 36, the universal joint 36 in turn being connected to the propeller 18 through a propeller shaft 38. The propeller shaft 38 is journaled to carry both the radial and thrust load thereof within a ball-shaped member 40 which is mounted for universal movement within a socket 42 carried by the fuselage 10 so that the propeller shaft 38 and the propeller 18 carried thereon can be pivoted within a limited range in any direction.

In a position slightly rearwardly of the ball 40, a collar 44 freely rotatable upon the shaft 38 is connected by a downwardly extending link 46 to a bell crank 48 connected at its opposite end to a push-pull rod 50. The opposite end of this push-pull rod 50 is pivoted to the control stick 52 in a position above the stick's transverse pivot point. With this linkage, if the upper end of the control stick is pushed forwardly, the push-pull rod 50 will rock the bell crank, thus raising the rearward end of the propeller shaft 38 and pointing the axis of the propeller downwardly. The effect, therefore, is that the thrust from the propeller will incline the airplane in a downward direction. Rearward movement of the upper end of the control stick 52 likewise inclines the axis of the propeller upwardly. By means of this arrangement the driving propeller 18 of the aircraft is used to control the movement of the aircraft about its transverse axis when the aircraft is traveling at speeds below those at which the empennage is fully effective.

As best shown in Fig. 1, the rudder pedals 54 are likewise connected to the collar 44 by a somewhat similar linkage arrangement 56, such that the axis of the propeller is swung from side to side as one or the other of the rudder pedals is pushed. For instance, when the left pedal is pushed, the axis of the propeller shaft is inclined to the left and the aircraft yaws toward the left. Thus, in a manner similar to that previously described, the movement of the aircraft about its vertical axis is controllable at slow speeds by arcuate movement of the driving propeller from side to side.

The top of the transmission housing 24 carries four upstanding parallel and equally circumferentially spaced hydraulic cylinders 58 connected together at their tops by a spider-like member 60. These cylinders 58 contain pistons 62 secured at their upper ends to a crosshead 64 so that the crosshead is carried upwardly when oil under pressure is pumped into the lower ends of these cylinders. Likewise, when oil is drained from these cylinders, the crosshead 64 will descend by gravity.

An oil reservoir 66 delivers oil through a conduit 68 to a pump 70. The oil is in turn forced from the pump through a conduit 72 to a distributing valve 74. With the valve in the position it assumes in Fig. 2, the oil flows through a passage therein and returns to the reservoir 66 through a return conduit 76. Under these conditions the pump idles as the oil is continuously circulated from the reservoir 66 to the pump 70, to the valve 74, and back to the reservoir 66. With the valve 74 in another position, the oil from the reservoir is forced by the pump 70 through the distributing valve 74, and thence through a conduit 78 to the cylinders 58, thus causing the pistons 62 to rise. A third position of the valve 74 permits the oil to circulate from the reservoir 66 to the pump 70, to the distributing valve 74, and thence to the reservoir 66, and also permits oil to drain from the cylinders 58 through the conduit 78, the valve 74, and conduit 76 to the reservoir 66, thus permitting the crosshead 64 to descend.

A rotor drive shaft 80 is journaled in the transmission housing 24 and is connected by a bevel gear 82 at its lower end to a second bevel gear 84 journaled to rotate freely upon the transmission shaft 22. This bevel gear 84 in turn is splined to a slidable clutch member 86 having a clutch plate engageable with a complementary plate on a second clutch member 88, this latter member being keyed to and revolvable with the transmission shaft 22. Thus, with the clutch member 86 in engagement with the clutch member 88, the transmission shaft 22 will drive the rotor shaft 80. With the clutch member 86 in its forward position, the rotor shaft 80 is not connected to the motor 20.

A manually actuated brake 90 under the control of the operator is provided for stopping the rotation of the rotor drive shaft 80 whenever desired.

At its upper end the rotor shaft 80 is journaled in the spider 60 and is splined at 91 to a short shaft 92 journaled to rotate in the crosshead 64, which takes both the radial and thrust load on the short shaft. Thus, if the crosshead 64 is moved upwardly or downwardly, the short shaft 92 and a yoke 94 secured to its upper end move therewith and maintain their driving connection with the rotor drive shaft 80 through the expedient of the splined coupling at 91.

The two arms 96 of the yoke 94 at their outer ends journal aligned pins 98 secured to the midpoint of a rotor housing 100. This housing 100, which forms the central section of the rotating wing, is a generally oval-shaped box-like member of a length slightly more than one-third that of the extended wing span. Inside this housing a set of upper and lower U-shaped tracks 102 and 104, respectively, extend longitudinally of the housing along the sides thereof. Each of these tracks serves to guide a pair of rollers 106 secured in longitudinally spaced relationship near the root along the leading and trailing edges of the outer wing sections.

One of these wing outer sections may be referred to as the upper wing 108, since this section slides into and out of the upper portion of housing 100, while the lower outer wing section 110 slides inwardly and outwardly in the lower tracks 104 in a position beneath the wing section 108. Thus, when in their retracted positions, the outer wing sections are substantially longitudinally co-extensive with the center section 100 and one of these outer sections lies above the other.

As shown in greater detail in Figs. 3, 5, 6 and 7, one end of each of a pair of shock cords 112 is connected to the end of a housing 100 adjacent the root of the upper wing section 108 when retracted. These shock cords extend axially through substantially the center of the wing element 108 and are secured at their opposite ends to the wing in a position near it tip. The cords are placed under sufficient tension so that with the wing stationary relative to the fuselage or revolving at low speeds, the cords will draw the wing section 108 into the sleeve 100. Similarly, a second set of shock cords 114 are connected to draw inwardly the lower wing section 110 in a like manner. The tension of these cords is so adjusted that although they hold the outer wing elements in their inward positions with the rotor stationary, yet as this rotor is brought up to speed, the centrifugal force acting upon the outer wing elements is sufficient to overcome the tension in the shock cords and cause these wing elements to move outwardly to their extended positions. In order to insure this movement taking place, the wing elements should not reach a dead center position, but should be so constructed or disposed that the centers of gravity of the wing sections are on the outward sides of the pivots 98 even when the wings are retracted. Likewise, as the brake is applied and slows the rotation of the rotor, the shock cords will overcome the centrifugal force tending to hold the blades outwardly and will retract the blades into the sleeve 100.

In order to insure both wing elements moving outwardly or inwardly together, a synchronizing arrangement is provided. This arrangement comprises a pair of long screw shafts 116 that are journaled in bearing members carried by the housing 100 at a position somewhat beyond the root ends of the outer wing sections when these sections are in their retracted positions. These screw shafts extend longitudinally through the hollow wing spars almost to the wing tips and are threaded through nuts 118 fixed in the wing roots. Thus, as the wing sections move outwardly or inwardly, the nuts cause the screw shafts to be rotated. Each of these shafts is connected by means of a sprocket and chain drive 120 to an intermediate shaft 122 extending from end to end of the sleeve 100. Therefore, if one of the wing sections moves either inwardly or outwardly, its nut will cause its shaft 116 to rotate. This rotation will be imparted to the intermediate shaft 122 and, in turn, will cause the other screw shaft 116 to rotate, thus moving the other outer wing section either inwardly or outwardly along with the first section. Since, in general, the two wing sections will tend to move together at all times, it will be appreciated that the forces to be overcome by the above described synchronizing arrangement will be slight and that, therefore, the elements included in this arrangement need not be heavy.

Each of the outer wing sections 108 and 110 may be constructed in any approved manner such as by the use of a tubular spar 124 extending from end to end of the wing and to which ribs 126 are secured in spaced relationship. The fabric covering is, in turn, secured to these ribs. The center section 100, shown in the drawings, is of semi-monocoque construction, that is, a sheet metal skin 128 carries the major portion of the load and is stiffened by bulkheads 130 connected together by the tracks 102 and 104 which serve as longitudinal stringers.

As best shown in Fig. 7, the tracks 104 at the end of the center section 100 out of which the lower wing section 110 projects when extended, are provided with stops 132. Thus, when the lower wing section 110 is extended, the first pair of rollers 106 to reach the end of the track 104 abuts against the stops 132 and prevents further outward movement of the lower wing section. This pair of rollers and the similar pair farther toward the root of the lower wing section transmit the lift of the lower blade to the center section. In a similar manner the upper tracks 102 are provided with stops at the opposite end of the center section to limit the outward movement of the upper rotating wing element 108.

In operation, assuming that the aircraft is on the ground with the motor running, the valve 74 is shifted to such position that the oil circulated by the pump 70 raises the retracted rotatable wing to its uppermost position. The clutch 86 is then engaged to bring the rotor up to speed. At some point during the acceleration of the rotor, the centrifugal forces acting upon the blades 108 and 110 will cause these blades to move outwardly to their extended positions against the resilient restraining force provided by the shock cords 112.

After the rotor has reached a sufficient speed, the clutch 86 can be disengaged and the aircraft can be flown away as an autogiro. However, it is preferred that the clutch be maintained in engagement and that upon a sufficient additional increase in rotor speed, the aircraft be flown as a helicopter. If the aircraft is flown as a helicopter, it will be appreciated that sufficient rudder pedal pressure must be carried by the operator to swing the propeller 18 to one side as previously described so as to overcome the torque reaction of the rotor.

After the aircraft has attained a sufficient altitude and a sufficient forward speed so that it can be maintained in flight by the fixed wings 12, the clutch 86 is disengaged, unless it has been previously disengaged, and the brake 90 is used to stop rotation of the rotatable wing. As the rotation of the wing becomes slower, the resilient shock cords 112 will draw the outer wing elements into retracted position within the center section 100. The center section is then aligned with a longitudinally extending aperture 134 in the top of the fuselage by proper use of the brake and clutch and the valve 74 shifted to the proper position to drain the hydraulic fluid from the cylinders 58. The rotatable wing then settles into the aperture 134 and is thus out of the airstream. The aircraft may thereafter be flown as a fixed wing aircraft.

When it is desired to land, the rotor center section is again lifted and the clutch 86 engaged to bring the rotor up to such a speed that the outer wing elements become extended. The clutch 86 can then be disengaged to permit the aircraft to land as an autogiro or, if desired, the clutch can be maintained in engagement and the aircraft can be landed as a helicopter.

In Figs. 8, 9, and 10, I have shown an alternative rotatable wing for use with the aircraft such as that shown in Figs. 1 and 2. In this embodiment of the invention, the head 136, similar to the previously mentioned head 64, is carried to be raised or lowered upon pistons 138 operating in cylinders 140. A spider 141 connects together and is welded to the upper ends of these cylinders. This head 136 journals a sleeve 142 through which a rotor shaft 144 extends. The shaft 144 is connected at its upper end to a rotor center section 146 while its lower end is of smaller diameter and is provided with splines 148 to permit this shaft to be driven from a drive shaft 150. The upper end of the drive shaft 150 telescopes over this splined portion of the shaft 144 and is journaled at the center of the spider 141. At the lower end of the enlarged upper portion of the shaft 144, an outwardly extending annular face 151 acts together with ball bearings 153 to transmit the upward thrust of the rotor to the head 136.

The rotating wing center section 146 is a generally rectangular frame of approximately the same length as the center section 100 in the previously described embodiment. This center section, however, is connected directly to the shaft 144 rather than being pivoted thereto at its midpoint as in the other embodiment. At each side the center section is provided with parallel tracks 152 extending longitudinally from end to end thereof. A pair of runners 154 are mounted to slide along these tracks and upon their upper sides at their outer ends are pivoted by transverse pins 155 to slotted yokes 156 which, in turn, are pivoted by vertical pins 157 to outer wing elements 158. Thus the outer wing elements are free to swing from side to side and are also free to cone upwardly.

A pair of sprockets 160 are journaled by vertical pins 161 at each end of the center section 146 and a roller chain 162 is passed around these sprockets.

This chain 162 is attached to each of the runners 154 so that when one of the runners is moved inwardly or outwardly, this motion will be transmitted to the other runner.

A second sprocket secured to rotate with one of the sprockets 160 is connected by means of a roller chain 164 to a drive sprocket 166 attached to the sleeve 142. It will be appreciated, therefore, that by causing relative rotation between the sleeve 142 and the shaft 144, the outer wing elements can be either extended or retracted.

As the outer wing elements 158 are moved inwardly toward their retracted positions, they will tend to incline backwardly relative to the axis of the center section 152 and they will also cone upwardly somewhat. In order to bring these outer wing elements into parallel relationship to each other and to the center section 146, a pair of guide arms 168 are secured to the center section 146 in positions somewhat outwardly from the center of rotation thereof. These guide arms 168 are provided with rollers 170 so positioned that they engage the upper and lower surfaces of the outer wing elements at their trailing edges and urge the wing inwardly along the edge of the center section 146. A third roller 171 arranged in a position immediately over the thickest portion of the wing aids in urging the wing downwardly as it is moved inwardly.

As in the first embodiment, the outer wing elements are caused to move outwardly by centrifugal force as the rotation of the center section is brought up to near its flying speed since the weight of the individual wing sections is concentrated outwardly of the center of rotation. In order to retract the outer wing elements, a brake 172 is applied to slow down the rotation of the sleeve 142 relative to the shaft 144. The relative rotation between the sleeve and the shaft will cause the sprockets 160 to be revolved with the result that the runners 154 and outer wing elements will be moved toward the opposite end of the center section 146. When the runners have reached the end of their travel, the brake 172 will slip and while this brake is slipping the rotation of the center section is stopped and the center section retracted into its slot in the upper portion of the fuselage.

A third rotor for use with an aircraft of the type shown in Figs. 1 and 2 is illustrated in Figs. 11 to 14. In this embodiment a rotor shaft 174 carries a rotor head 176 to which blades 178 are articulated by yokes 180 which permit upward and downward movement of the blades about horizontal pins 181 and side to side movement about vertical pins 182.

Each of the rotating blades 178 is built up of two sections, the inner section 184 of which extends outwardly for approximately one-third of the length of the blade. At its outer end this inner section is connected by means of a vertically extending pin 186 to the inner end of the outer blade section 188. The inner end of the outer blade section is positioned above the outer end of the inner blade section and since it is fixed to the pin 186 while this pin is journaled to rotate in the inner blade section 184, rotation of this pin will swing the outer blade section 188 backwardly and inwardly to the position shown in dot dash lines in Fig. 11. Near their lower ends, these pins 186 are keyed to gears 190 driven by worms 192 carried upon the outer ends of longitudinally extending shafts 194. The inner ends of these shafts are, in turn, secured to gears 196. In each instance the gear 196 is driven by a worm 198 connected by a transverse shaft 200 to revolve with a gear 202, and this gear is, in turn, driven by a third worm 204 mounted upon the shaft of a reversible electric motor 206.

The motors 206 are housed within the inner blade sections 184 near their roots and, whereas the major portion of the inner blade section is of airfoil form, the section of this wing which houses the motor 206 is of somewhat thicker streamline form.

In operating this arrangement, the operator closes a switch to energize the motors 206 and these motors operate to swing the outer wing elements 188 into extended flying position. To retract the blades, the motor 206 is operated in the reverse direction. In order to insure both blades being moved outwardly and inwardly together, the two motors 206 are connected together by a flexible shaft 208.

Other than the manner of extending and retracting the outer wing sections, the operation of an aircraft equipped with this type of rotor is similar to those embodiments of the invention previously described. A rotor of this type requires a somewhat wider although shallower aperture in the fuselage for its disposal, however. With this construction, it will be seen that the blades are free to pivot from side to side and to cone upwardly directly from the rotor head, and thus automatically resolve the various forces acting upon these blades into tension. For this reason this rotor can be built somewhat lighter in weight than those of the previously described embodiments.

Still another embodiment of my invention is shown in Figs. 15 to 22. Here I have shown an aircraft having a fuselage 210, fixed wings 212, propeller 214, and empennage 216. As in the first embodiment the fuselage contains a motor 218 connected by means of shafting 220 to drive the propeller 214. In the present embodiment, however, the driving propeller revolves about a fixed axis and the auxiliary control necessary when the aircraft is flying at slow speeds or where it is operated as a helicopter is exercised by a supplementary or auxiliary propeller 222. It will be understood that if desired the forward propeller may also be made movable as in Figs. 1 and 2. As in the last described embodiment, a hydraulic system 224 is used to elevate a rotor mast 226. This mast at its upward end journals a rotor head 228 driven from the engine 218 through beveled gears 230, a friction clutch 232 and a shaft 231, thus the engagement of the clutch 232 causes the rotor shaft 231 and rotor to be revolved by the engine while with the clutch disengaged the rotor is free to autorotate or to be stopped.

In the embodiment of the aircraft here shown, a four-bladed rather than a two-bladed rotor is used. With a rotor of this type, an aircraft of high wing type is preferred. This is because the retracted rotor forms a cross, two arms of which can be stowed in an aperture in the fuselage while the other two blades which extend transversely of the aircraft below the first two mentioned blades can be housed within apertures in the upper surface of the fixed wing 212.

The rotor is comprised of two separate but similar sets of blades, the two blades forming the upper pair 234 extending outwardly from the rotor hub in alignment, while the blades forming the lower set 236 are in alignment and extend at right angles to the upper set. In generaly, the blades used in this embodiment are similar to those in the last previously described embodiment excepting that two sets instead of a single set are used. The blades in the present embodiment, however, have the additional advantage that their angle of attack can be changed at any time so as to give the rotor maximum efficiency under different conditions. For instance, is desired, the angle of attack of the rotor can be different when the aircraft is being used as a helicopter than when the aircraft is being flown with the rotor autogyrating, or the angle of attack of the blades can be set at zero and the rotor overspeeded, after which the angle can be increased to permit a jump takeoff.

Excepting for notches 238 formed in the trailing edge of the lower set of blades 236, the upper and lower set of blades are substantially identical and, therefore, only one set will be described in detail. The notches 238 are merely for the purpose of permitting the outer sections of the lower wing elements to be retracted more closely together for purposes of stowing the rotor within the aircraft pockets. The upper wing elements can be retracted until the trailing edges of one of the outer elements is substantially in contact with the trailing edge of the other element. However, retraction of the outer portions of the lower rotor element to a like position is not possible without the notches 238, as without these notches, the trailing edges of the outer elements would impinge upon the rotor mast 226. The notches 238, therefore, are merely to provide clearance around the rotor mast when the lower wing elements are in retracted position.

Because the lower blade elements 236 are below the upper blades 234, the level of the pockets into which the upper blades are retracted is above the pockets into which the lower blades are retracted. The upper blades are retracted into a slot 240 in the fuselage while the lower blades are retracted into a slot 242 in the upper surface of the fixed wing. It is preferable, therefore, to secure the fixed wing to the fuselage in a position slightly below the upper fuselage surface so that the pockets in the wings will be somewhat lower than the pocket in the fuselage.

With the rotor housed within the fuselage and wings, the slots in the upper surfaces of the wings may be covered so as to give the wings a smooth surface. This is accomplished by providing a pair of longitudinally slidable panels 244. These panels slide in tracks in the wings so arranged that by any suitable actuating means these panels can be slid longitudinally outwardly of the wings to uncover the pockets in the upper surface when it is wished to extend the rotor. After the rotor has been retracted into the wing, these panels 244 are pulled inwardly over the top of the rotor to give the wing an airfoil shape. Likewise, if desired, a similar sliding panel can be used to close the slot 240 in the top of the fuselage as in the manner shown in my co-pending application Serial No. 148,085, filed June 14, 1937, now Patent No. 2,330,803.

As in the last above described embodiment, the rotating wing elements are made up of inner sections 246 articulated to a rotor head 248 so that they have limited freedom of movement both from side to side and upwardly. These inner sections 246 are connected to the outer sections by means of vertically extending pins 250 journaled to rotate at the outward end of the inner sections 246. As in the previously described embodiment, a gear 252 surrounds each of the pins 250 and is driven by an electric motor, not shown, by means of a reduction drive arrangement, also not shown but identical with that previously described, this reduction gearing culminating in a longitudinally extending shaft 254 which revolves a worm gear 256 in mesh with the gear 252. The gears 252, however, are not secured directly to the pins 250 as in the previously described embodiment, but are free to rotate relative to these pins.

Since all of the blades are alike, a description of one of these blades will suffice. The upper end of the pin 250 has a portion 258 inclined at an angle of, for instance, 11° relative to the vertical portion which extends into the inner wing section 246. This feature is best shown in Fig. 20. The outer wing section indicated by the numeral 260, is journaled to rotate about the upper portion of pin 258 to a limited extent, the degree of rotation being restricted by a pin 262 projecting radially from the upper portion 258 into a fan-shaped slot 264 in the outer wing element 260. That is, relative rotation between the upper portion of the pin 258 and the outer wing section is limited by the side of the pin 262 coming into abutment with either one or the other end of the slot 264. In the embodiment shown, this degree of relative rotation is restricted to approximately forty degrees. Within the wing 246 a flat coil spring 266 is secured at its inner end to the pin 250 and at its outer end to a bracket 268 that is in turn attached to the inner wing section 246. This spring is under tension at all times and tends to hold the pin 250 in the position shown in Fig. 21 with a stop pin 270 projecting radially from the pin 250 in engagement with a stop member 272 attached to the inner wing section 246. This spring is intended to exert sufficient force to permit the outer wing element to swing around the upper portion of the pin 250 without rotating the pin 250 until the pin 262 has been engaged by the rearward end of the slot 264.

The rotation of the gear 252 is imparted to the outer wing section 260 by means of a vertical pin 274 secured at its lower end to the gear 252 in eccentric position. This pin 274 projects through an arcuate slot 276 in the upper surface of the inner wing section 246 and its upper end extends into an opening 278 in the lower surface of the outer wing section 260. Thus as the gear 252 is rotated, the pin 274 will be swung arcuately around the pin 250 and will cause the outer wing element 260 to swing in a like manner.

The operation of this wing is as follows: starting with the wing in its retracted position, the pin 262 will be urged against the end of the fan-shaped slot 264 by the spring 266. Because of the inclination of the upper portion 258 of the pin 250 relative to its lower portion, the wing in this position will be at zero angle of incidence. As the gear 252 is revolved to swing the wing section 260 outwardly, the pin 250 will rotate therewith because of the spring 266. Thus as the wing section 260 swings outwardly it will be maintained at no angle of incidence until it reaches the position A shown in Fig. 19. At this point the stop pin 270 will be brought against the stop member 272 and additional rotation of the pin 250 will be prevented. If the gear 252 continues to rotate, the wing 260 will continue to swing outwardly. However, since the pin 250 will not longer rotate because of the stop members 270 and 272, the wing 260 will pivot about the oblique axis of the portion 258. The angle of incidence of the wing is thus gradually increased until at the point B shown in Fig. 19, it will have reached an angle of incidence effective for some purposes. Additional swinging movement of the outward section 260 will increase the angle of incidence to a maximum of about 10°, which is reached at the point C. Further movement of the wing in this direction is prevented by the pin 262 abutting against the end of the fan-shaped slot 264 nearest the leading edge of the wing section 260 and by the pin 274 reaching the end of the arcuate slot 276. Similarly, reverse rotation of the wing section 260 will first decrease its angle of incidence to zero, while from this point onwardly, the outer wing section will be maintained at a zero angle of incidence as it swings inwardly to its completely retracted position.

The control of this aircraft at low speeds is exercised by a single bladed auxiliary control propeller 222 arranged in a position somewhat rearwardly of the empennage. This propeller is engine driven when clutch 232 is engaged or if this clutch is disengaged it is driven by the rotatable wing 234. For control purposes, the axis of this propeller is movable in two directions. As shown in Figs. 15 and 16, the axis of rotation of the propeller extends transversely of the aircraft. By a control means to be described, this axis can be inclined either upwardly or downwardly from this position, or it can be inclined rearwardly of this position.

With the propeller axis pointing directly transversely of the aircraft, the propeller exerts more than sufficient tractive effort to overcome the torque reaction of the rotating wing when the latter is engine driven. Therefore, for normal straight flight, the axis of the auxiliary propeller 222 will be inclined rearwardly to a considerable extent so that the component tending to move the tail of the aircraft to one side to overcome the rotor torque reaction will be only a fraction of the total force developed by the auxiliary propeller. When it is desired to move the aircraft about its yawing axis, the axis of the auxiliary propeller will be swung either forwardly toward its transverse position or more toward the rear, thus giving either more or less force acting to swing the tail to one side. Likewise, if it is desired to lower or elevate the tail of the aircraft to give control about the pitching axis, the axis of the auxiliary propeller is moved either upwardly or downwardly to give a vertical component and also simultaneously somewhat forwardly, so that the transverse component of the auxiliary propeller remains substantially the same.

The arrangement and construction of the auxiliary propeller mounting means comprises a tubular member 280 which extends directly rearwardly from the upper portion of the vertical fin 282 and is journaled to rotate in bearing members 284 positioned within the fin. Between these bearing members the tube is provided with a drum 286 about which a control cable 288 is wrapped and secured so that pulling one end of this cable will cause the tubular member 280 to rotate in one direction while pulling the opposite end of the cable will cause the tubular member to rotate in the opposite direction. This cable 288 extends around pulleys 286 positioned below the drum 286 and thence downwardly and forwardly where at its ends it is connected to the control stick 292 at positions above and below the transverse pivot of the control stick. Thus, as the control stick is pushed forwardly, it will pull upon one end of the cable 288 and cause the tubular member 280 to be revolved in a clockwise direction as viewed from beyond the rearward end of the aircraft. This inclines the axis of the propeller downwardly, and since the propeller is of the pusher type, the tail of the aircraft is lifted and its nose pointed downwardly. Similarly, movement of the upward end of the control stick rearwardly will cause the tubular member 280 to be revolved in the opposite direction and the aircraft to be inclined upwardly.

A rotatable shaft 294 extends axially through the tubular member 280 and is provided at its forward end with a gear 296 meshed with a second gear 298 carried upon a shaft 300 which extends forwardly and downwardly to the foot of the rotor mast 226. At its forward end, this shaft is provided with a gear 302 meshed with a gear 304 secured to the rotor drive shaft 231 in a position above the clutch 232. Thus, whenever the rotor is rotating, the shaft 300 and the shaft 294 will also rotate. At its rearward end, the shaft 294 is provided with a bevel gear 306 meshed with another bevel gear 308 which revolves about an axis at right angles to shaft 294. The gear 308 revolves freely around and is secured in place by a headed pin 310 passed therethrough and through an angular bracket member 312 secured to the tubular member 280. At its outward end the pin 310 carries a drum 314. A control cable 316 is passed around and secured to this drum 314 and extends forwardly and downwardly over pulleys 318 and 320 and at its forward ends is connected to rudder pedals 322, so that the pin 310 can be rotated from side to side by pushing one or the other of these pedals.

At its outward end the angle bracket 312 is bifurcated at 324 to permit the insertion of a second angle bracket 326. This second angle bracket 326 is free to pivot about a transverse axis and is keyed to the shaft 310. Thus, this second angle bracket 326 can be swung from side to side as one or the other of the rudder pedals is pushed.

As may best be seen in Fig. 18, the outward end of the angle bracket 326 is bent upwardly alongside the angle bracket 312 and journals a short propeller shaft 328 that carries the auxiliary propeller 222. At its inward end this propeller shaft carries a bevel gear 330 meshed with the gear 308. Thus, the engine driven shaft 294 rotates the bevel gear 308 by means of the gear 306, while the bevel gear 308 rotates the gear 330 and therefore drives the propeller 222. By means of the control stick and rudder pedals, the axis of the propeller can be inclined in two different planes as previously described. With this arrangement, pushing the left rudder pedal will swing the propeller axis rearwardly. The component of the propeller thrust tending to overcome the torque reaction of the rotor therefore becomes less than the torque reaction, and the aircraft yaws to the left. Similarly, pushing the right rudder pedal causes the axis of the propeller to swing forwardly toward a position transverse to the fuselage. The transverse component of the propeller thrust therefore becomes greater than the torque reaction of the rotor and the aircraft yaws to the right. When the aircraft is in flight with the rotatable wing retracted, the auxiliary propeller 222 will afford very little drag inasmuch as the long blade of this propeller will extend directly rearwardly while the short end of the blade will extend forwardly. In other words, the auxiliary propeller acts like a weathervane in assuming a position which offers minimum drag.

Although in order to promote clarity of illustration not all of the control linkage is shown in the drawings, it will be understood that the control stick and pedals are also connected to the elevators, ailerons and rudder in any well known manner so that when the aircraft reaches a speed at which these control surfaces become effective, the operator will be able to control the aircraft by the use of these surfaces.

Another alternative rotor for use with an aircraft of the type shown in Figs. 1 and 2 is illustrated in Figs. 23 to 27. Although the embodiment shown is a two bladed rotor, it will be appreciated that by constructing this rotor with four blades in the manner previously explained, it would be adapted for use with an aircraft of the type shown in Figs. 15 and 16.

In this embodiment a tubular rotor shaft 340 carries a rotor head 342 to which blades 344 are articulated. The head 342 is provided with a yoke 346 formed by upwardly extending parallel arms 348. A horizontal shaft 350 extends between and is fixed to these arms. A pair of generally horizontally disposed wing yokes 352 are arranged with the ends of the arms of one of these yokes inside the ends of the other and with the ends of both of the yoke arms pivoted to the shaft 350. As shown in Fig. 23, the outer faces of the left-hand yoke arms are maintained against sidewise movement by the inner faces of the upstanding arms 348 of the yoke 346, while the inner faces of the ends of the yoke 352 prevent sidewise movement of the somewhat narrower right-hand yoke 352.

The yokes 352 are provided with ears 354 pivoted to the inner ends of the rotor blades 344 by means of vertically extending pins 356. This construction, it will be appreciated, provides an arrangement which permits the blades to cone upwardly and also to advance and recede from a position extending radially from the axis of rotation.

In order to limit the downward movement of the right-hand blade, the inner yoke 352 is provided at its ends with downward extensions 358. The rotor head 342 has a pair of stop members 360 formed integrally therewith which are so disposed that the lower ends of the downward extension 358 are brought against these stops when the right-hand blade 344 descends into a horizontal position. In a like manner, upward extensions 362 at the ends of the left-hand yoke 352 abut against stop members 364 when the left-hand blade 344 is lowered into a horizontal position. This construction, it will be appreciated, permits the blades 344 to cone upwardly freely but prevents these blades from dropping below a horizontal position to any great extent.

As shown in the drawings, the left-hand blade 344 includes an inner section 366 which extends outwardly from the rotor hub a distance equal to approximately one-third of the span of the left-hand blade. This inner section is provided near its root with a reversible electric motor 368 disposed within the blade and connected by means of a shaft 370 and universal joints 372 to a worm gear 374 journaled upon a horizontal axis near the outer end of the inner section. This worm is so positioned and of such a diameter that a portion of its surface projects above the upper surface of the inner wing section, as may best be seen in Fig. 27.

The outer wing section indicated by the numeral 376 is shown in its extended position in Figs. 23 and 24. In this extended position, the inner end of the outer wing section is disposed against the upper surface of the inner wing section. On its lower side the outer section is provided with a rack 378 extending substantially the length thereof and in mesh with the worm 374. Thus, as the worm revolves in one direction, the rack and the wing section attached thereto will be extended, while if the direction of rotation of the worm is reversed, the outer wing section will be drawn inwardly.

Directly above the worm 374, a sleeve 380, formed integrally with the inner wing section 366 confines and supports the outer wing section, as best shown in Fig. 26. In order to ease the movement of the outer wing section through the sleeve 380, this sleeve is provided with a plurality of rollers 382 which are in contact with and roll over the surface of the outer wing section as it moves inwardly and outwardly. A stop 384, secured to and extending outwardly from the inner end of the outer wing section, impinges against the inner end of the sleeve 380 when the outer wing section is fully extended and prevents further extension of this wing element.

When it is desired to retract the outer wing element, the motor 368 is energized to revolve in the proper direction to draw the outer wing section inwardly. This outer section passes inwardly over the upper surface of the inner wing section and is glided in its inward movement by the rollers 382 within the sleeve 380 and by pins 386. These pins are secured to the upper surface of the inner wing section and extend into a slot 388 formed in the rack 378. These pins therefore co-act with the slot 388 to prevent sidewise movement of the inner end of the outer wing section.

The upwardly extending arms 362 of the yoke 352 are connected by a member 390 which journals a plurality of rollers 392. These rollers bear against the upper surface of the outer wing section as the inner end of this section passes the center of rotation and aid in establishing the alignment of the outer wing section during its retraction. The central portion 394 of the member 390 is offset upwardly somewhat, as shown in Fig. 25, so as to provide clearance for the stop member 384 at the rearward end of the outer wing section. When in its fully retracted position, the outer end of the outer wing section lies approximately directly above the outer end of the inner wing section 366 while the inner end of the outer wing section lies approximately opposite the outer end of the right-hand inner wing section 344. It will be appreciated therefore that when the wing is retracted, its span will be approximately one-third of its extended span.

The right-hand inner wing section 344 contains a motor 396 similar to the motor 368. This motor similarly is connected by means of a shaft 398 and universal joints 400 to a worm gear 402 similar to the worm gear 384. However, whereas a portion of the worm gear 384 projects above the upper surface of its inner wing section, a portion of the worm 402 projects below the lower surface of the right-hand inner wing section. The right-hand outer wing section 404 is provided with a rack 406, similar to the rack 378 excepting that it is secured in the upper surface of the wing rather than in the lower surface thereof. This rack 406 is meshed with the worm 402 and at this point the outer wing section is confined within a sleeve 408 provided with rollers 410. The rollers and sleeve are similar to the rollers and sleeve at the outer end of the left-hand wing section excepting that they are disposed so as to support the outer wing section 404 below rather than above the inner wing section. Likewise, also, a stop member 412 at the inner end of the outer wing section 404 is arranged to impinge against the inner end of the sleeve 408 and prevent the outer wing section from being extended farther than desirable. Pins 414, similar to the pins 386, are secured to and project beyond the lower surface of the right-hand inner wing section 344 and guide the outer wing section 404 during its inward and outward movement. Near the center of rotation a set of guide rollers 416, similar to the rollers 392, are carried by a cross member 418 that is joined to the downward extension 358 of the right-hand yoke 352, while near its mid-point, the member 418 is offset downwardly to permit the passage of the stop member 412 so that there will be no interference between this stop member and the cross member 418 during inward and outward movement of the outer wing section 404.

The two motors 368 and 396 are operated together to move their respective outer wing sections inwardly and outwardly simultaneously. In order to insure these motors operating in synchronism, the two motor shafts are connected together by a flexible shaft 420. Electric cables 422 connected to these motors extend into the hollow drive shaft 340 and near the lower end of this shaft the three wires in the cable are connected to slip rings 424. These slip rings in turn receive their energy from a set of brushes 426 which are in contact therewith. The brushes are connected by a suitable circuit to a source of electrical energy and to controls to be actuated by the operator of the aircraft. Although not illustrated in Fig. 12, it will be apparent that this same arrangement can be used for energizing and controlling the wing retracting motors there shown.

As in the previous embodiments, the outer wing sections are extended when the aircraft is to take off and remain extended whenever the aircraft is flown either as a helicopter or an autogiro. After the plane has reached sufficient forward speed, the clutch is disengaged, a brake of the type shown and described in connection with the embodiment illustrated in Fig. 2 is employed to stop the rotation of the shaft 340, and the motors 368 and 396 energize to retract the outer wing elements. After they have been fully retracted, the rotor is aligned with the aircraft fuselage and lowered by means of the hydraulic system previously described into an aperture in the top of the aircraft. The aircraft is then adapted to be flown as a fixed wing aircraft.

When it is desired to descend, the rotor mast is elevated and the outer wing elements extended, after which the rotor is brought up to flight sustaining speed. The aircraft then can be landed either as an autogiro or as a helicopter, as is preferred.

Although the alighting gear has been shown diagrammatically in the drawings, it will be appreciated that an aircraft of the present type should preferably be equipped with a retractable gear in order to obtain maximum benefits from the present invention. Such a retractable alighting gear is shown and described in my co-pending application previously referred to.

From the foregoing description of several embodiments of my invention, it will be seen that I have provided a novel aircraft fulfilling all of the objectives set forth at the beginning of this specification.

What I claim as new and useful and desire to secure by Letters Patent of the United States is:

1. In a variable radius rotatable wing, in combination, a central rotatable member, a radially extending structure carried thereby, an airfoil section blade rotatably mounted on the outer end of said structure, means under the control of an operator adapted to cause said blade to rotate around its rotatable mounting from a position with its outer end projecting outwardly from said structure on one side of said central member to a position with its outer end projecting outwardly on the opposite side of said central member, said controllable means comprising power means located adjacent said central member, and drive means connecting said power means to said rotatably mounted blade for rotating said blade in response to control of said power means by an operator.

2. In a variable radius rotatable wing, in combination, a central rotatable member, a radially extending structure carried thereby and hinged thereto to provide a flapping axis, rotatable mounting means at the outer end of said structure, an airfoil section blade carried by said rotatable mounting means, a motor mounted in said structure, drive means connecting said motor means to said rotatable mounting means, means for controlling said motor passing from said structure to said central member whereby said motor can be controlled by an operator to cause said rotatable mounting to rotate said blade from a position with its outer end projecting outwardly from said structure on one side of said central member to a position with its outer end projecting outwardly on the opposite side of said central member.

3. In a variable radius rotatable wing, in combination, a radially extending rotatable structure, movable mounting means at the outer end of said structure, an airfoil section blade carried by said movable mounting means, and power means for moving said movable mounting means and said blade relative to said mounting means, said movable mounting means including angularly disposed portions about which said movable mounting means and blade are movable to vary the pitch of the blade and to vary the radius of said rotatable wing.

4. In a variable radius rotatable wing, in combination, a central rotatable member, a radially extending structure carried thereby, rotatable means having two portions in angular relation to one another at the outer end of said structure, means for rotating said means about the axis of one of said portions, an airfoil section blade mounted for movement relative to the other angular portion of said rotatable means and about the axis of said other portion, and means under the control of an operator adapted to cause said blade to move about said other portion of said rotatable means to vary the pitch of said blade and to cause said rotatable means to rotate about said axis of the one portion to vary the radius of said rotatable wing.

5. In a variable radius rotatable wing, in combination, a central rotatable member, a hollow structure carried thereby extending radially on either side of said central member, a movable airfoil section blade carried by said structure and adapted to occupy a retracted position inside and coextensive with said structure, and to occupy an extended position with its outer end projecting outwardly from the outer end of said structure and its inner end carried within the outer end of said structure, resilient means normally moving said blade to its retracted position, power means for rotating said rotatable wing to cause said blade to move to its extended position, and means for controlling said power means.

6. In a variable radius rotatable wing, in combination, a central rotatable member, a hollow structure carried thereby extending radially on either side of said central member, two movable airfoil section blades carried by said structure and adapted to occupy retracted positions inside and substantially coextensive with said structure and to occupy extended position with their outer ends projecting outwardly from the outer ends of said structure and their inner ends carried within the outer ends of said structure, resilient means normally tending to move said blades to their retracted positions, power means for rotating said rotating wing to cause said blades to move to their extended positions, and means interconnecting said blades adapted to cause one blade to move inwardly or outwardly the same amount and in the opposite direction as the other blade.

7. In a variable radius rotatable wing, in combination, a central rotatable member, a hollow structure hingedly carried thereby extending radially on either side of said central member, two movable airfoil section blades carried by said structure and adapted to occupy retracted positions inside said structure with the opposite ends thereof on opposite side of said central rotatable member and to occupy extended positions with their outer ends projecting outwardly from the outer ends of said structure and their inner ends carried within the outer ends of said structure.

8. In a variable radius rotatable wing, the combination including, a central rotatable member, a radially extending structure hingedly secured to said member, an airfoil section blade movably mounted on said structure for movement from a position wherein the blade is entirely at one side of and disposed generally radially relative to said central member to a position wherein it is located generally diametrically relative to the circle swept by said central member when the member rotates and with its ends on opposite sides of the axis of rotation of the member, and means for effecting the movement of said blade between said positions.

9. In a variable radius rotatable wing, the combination including, a central rotatable member, radially extending structure hingedly carried thereby, an airfoil section blade mounted on said structure for movement generally radially of the axis of rotation of said member from a position wherein the blade is entirely at one side of and disposed generally radially relative to said central member to a position wherein it is located generally diametrically relative to the circle swept by said central member when the member rotates and with its ends on opposite sides of the axis of rotation of the member, and means for effecting the movement of said blade between said positions.

10. In a variable disc area rotatable wing, in combination, a central rotatable member, a radially extending structure carried thereby, an airfoil section blade rotatably mounted on the outer end of said structure, and means under the control of an operator adapted to cause said blade to rotate around its rotatable mounting from a position with its outer end projecting outwardly from said structure on one side of said central member to a position with its outer end projecting outwardly on the opposite side of said central member, thereby to reduce the disc area of the wing.

11. In a variable disc area rotatable wing, in combination, a central rotatable member, a radially extending structure carried thereby and hinged thereto to provide a flapping axis, an airfoil section blade rotatably mounted on the outer end of said structure, and means under the control of an operator adapted to cause said blade to rotate around its rotatable mounting from a position with its outer end projecting outwardly from said structure on one side of said central member to a position with its outer end projecting outwardly on the opposite side of said central member, thereby to reduce the disc area of the wing.

12. In an aircraft rotatable wing, a central rotatable member, a pair of radially extending structures pivoted to said central member to provide a flapping axis for said structures, a pair of airfoil section blades secured to the outer ends of said radially extending structures and adapted to slide longitudinally inwardly relative thereto, one of said blades being secured to said radially extending structure in a position beneath the lower surface thereof, the other of said blades being secured to the other of said radially extending structures in a position above the upper surface thereof, means to move said blades longitudinally relative to said structures so that the inner ends of said blades move inwardly past the central rotatable member and outwardly on the other side thereof, and said central rotatable member being formed with space beneath the plane of said radially extending structures to permit the passage of said lower blade element.

13. In a variable radius rotatable wing, a central rotatable member, a pair of radially extending structures carried thereby, airfoil section blades secured to said structures and adapted to move longitudinally relative thereto, one of said blades being positioned adjacent the upper surface of one of said structures and the other of said blades being positioned adjacent the lower surface of the other of said structures, the surfaces of said blades facing said structures being provided with racks, rotatable gear means cooperating with said racks to move said blades longitudinally with respect to said members and power means to rotate said gear means.

14. In a variable radius rotatable wing in combination, a rotatable structure, rotatable mounting means at the outer end of said structure, said mounting means including a portion having an axis parallel to that of the rotatable structure and a portion disposed at an angle relative to the first portion, an airfoil section blade mounted on said angularly disposed portion of the mounting means for limited angular movement relative thereto, means for rotating said blade and the mounting means simultaneously to vary the radius of said blade, and means for rotating said blade about said angularly disposed portion of the mounting means to vary the pitch of said blade.

15. A variable radius rotatable air screw, including in combination, central structure rotatable about an axis of rotation, an air engaging blade, means movably supporting said blade upon said central structure for pivotal movement relative to said structure from an expanded position with both ends of said blade at one side of and projecting outwardly from said central structure to a contracted position with one end of said blade on the other side of the axis of rotation of said central structure, and means for moving said blade between said expanded and contracted positions, said means being so constructed as to enable movement of said blade while the air screw is rotating, whereby the radius of the disc swept by said air screw is reduced as a result of said pivotal movement.

16. A variable radius rotatable air screw, including in combination, central structure rotatable about an axis of rotation, an air engaging blade, and means movably supporting said blade upon said central structure for pivotal movement relative to said structure about an axis parallel to said axis of rotation from an expanded position with both ends of said blade at one side of and projecting outwardly from said central structure to a contracted position with one end of said blade on the other side of the axis of rotation of said central structure, whereby the radius of the disc swept by said air screw is reduced as a result of said pivotal movement.

17. A variable radius rotatable air screw, including in combination, central structure rotatable about an axis of rotation, an air engaging blade, and means movably supporting said blade upon said central structure for pivotal movement relative to said structure from an expanded position with both the inner and outer ends of said blade at one side of and projecting outwardly from said central structure to a contracted position in which the outer end of said blade projects from its pivotal axis generally toward the axis of rotation of said central structure, and means for moving said blade between said expanded and contracted positions, said means being so constructed as to enable movement of said blade while the air screw is rotating, whereby the radius of the disc swept by said air screw is reduced as a result of said pivotal movement.

18. A variable radius rotatable air screw, including in combination, central structure rotatable about an axis of rotation, an air engaging blade, and means movably supporting said blade upon said central structure for pivotal movement relative to said structure about an axis parallel to said axis of rotation from an expanded position with both the inner and outer ends of said blade at one side of and projecting outwardly from said central structure to a contracted position in which the outer end of said blade projects from its pivotal axis generally toward the axis of rotation of said central structure, whereby the radius of the disc swept by said air screw is reduced as a result of said pivotal movement.

19. In an aircraft of the type having a fuselage, the combination including, a variable radius rotatable wing carried by said fuselage, said wing including a radially extending structure, an airfoil section blade pivotally mounted on said structure for movement from an expanded position in a generally radial plane with the blade entirely at one side of said structure to a contracted position close to said plane with one end of said blade on one side and the other end of said blade on the other side of the axis of rotation of said central structure, said structure and blade having lengths and being so arranged that in contracted position the radius of the wing is less than one-half its maximum radius whereby the radius of the disc swept by said air screw is reduced.

20. In an aircraft of the type having body structure, the combination comprising a variable radius rotatable wing including a central rotatable member, a radially extending structure hingedly secured to said member, an airfoil section blade movably mounted on said structure for movement from a position wherein the blade is entirely at one side of and disposed generally radially relative to said central member to a position wherein it is located generally diametrically relative to the circle swept by said central member when the member rotates and with its ends on opposite sides of the axis of rotation of the member, means for effecting the movement of said blade between said positions whereby the rotatable wing may be contracted, a recess in the body structure of said aircraft and means for retracting the contracted rotatable wing into said recess.

21. In a variable radius rotatable wing, the combination including a central rotatable member, a radially extending structure hingedly secured to said member, airfoil section blades movably mounted on said structure for movement from a position wherein each blade is entirely on one side of and disposed generally radially relative to said central member to a position wherein it is located generally diametrically relative to the circle swept by said central member when the member rotates and with its ends on opposite sides of the axis of rotation of the member, said structure and blades having lengths and being so arranged that in contracted position the radius of the wing is less than one-half its maximum radius, and means for effecting movement of said blades between said positions whereby the rotatable wing may be contracted.

22. In an aircraft of the type having body structure, the combination comprising a variable radius rotatable wing including a central rotatable member, a radially extending structure hingedly secured to said member, an airfoil section blade movably mounted on said structure for movement from a position wherein the blade is entirely at one side of and disposed generally radially relative to said central member to a position wherein it is located generally diametrically relative to the circle swept by said central member when the member rotates and with its ends on opposite sides of the axis of rotation of the member, said structure and blade having lengths and being so arranged that in contracted position the radius of the wing is less than one-half its maximum radius, means for effecting movement of said blade between said positions whereby the rotatable wing may be contracted, a recess extending fore and aft of the body structure of said aircraft, and means for retracting the contracted rotatable wing into said recess.

EDWARD F. ANDREWS.

REFERENCES CITED

The following references are of record in the file of this patent:

UNITED STATES PATENTS

| Number | Name | Date |
| --- | --- | --- |
| 842,505 | Unsinger | Jan. 29, 1907 |
| 1,019,635 | Harlow | Mar. 5, 1912 |
| 1,670,923 | Arnold | May 22, 1928 |
| 1,672,985 | Martin | June 12, 1928 |
| 1,721,450 | Hooper | July 16, 1929 |
| 1,761,444 | Jones | June 3, 1930 |
| 1,763,819 | Reed | June 17, 1930 |
| 1,855,084 | Alvistur | Apr. 19, 1932 |
| 1,887,676 | Brylka | Nov. 15, 1932 |
| 1,922,866 | Rosenberg | Aug. 15, 1933 |
| 1,994,488 | Sikorsky | Mar. 19, 1935 |
| 1,997,240 | Taniguchi | Apr. 9, 1935 |
| 2,008,843 | Smith | July 23, 1935 |
| 2,021,470 | Upson | Nov. 19, 1935 |
| 2,041,796 | Stalker | May 26, 1936 |
| 2,081,436 | Martin | May 25, 1937 |
| 2,094,105 | Meyers | Sept. 28, 1937 |
| 2,110,563 | Thaon | Mar. 8, 1938 |
| 2,130,918 | De Stefano | Sept. 20, 1938 |
| 2,135,073 | Gerhardt et al. | Nov. 1, 1938 |
| 2,146,481 | Manning | Feb. 7, 1939 |
| 2,163,482 | Cameron | June 20, 1939 |

FOREIGN PATENTS

| Number | Country | Date |
| --- | --- | --- |
| 499,632 | Great Britain | Jan. 26, 1939 |
| 816,813 | France | May 10, 1937 |